United States Patent [19]

Ayres et al.

[11] 3,995,763
[45] Dec. 7, 1976

[54] BIAXIALLY ORIENTED THERMOPLASTIC CONTAINER WITH OR WITHOUT MOLDED TIP PERIPHERY

[75] Inventors: Ralph E. Ayres; Kenneth J. Cleereman, both of Midland; Walter J. Schrenk, Bay City, all of Mich.

[73] Assignee: The Dow Chemical Company, Midland, Mich.

[22] Filed: May 27, 1975

[21] Appl. No.: 581,295

Related U.S. Application Data

[60] Continuation of Ser. No. 389,921, Aug. 20, 1973, abandoned, which is a division of Ser. No. 295,092, Oct. 2, 1972, abandoned, which is a division of Ser. No. 62,969, Aug. 11, 1970, Pat. No. 3,739,052.

[52] U.S. Cl. .................................. 220/74; 264/92; 428/35; 428/500; 428/516; 428/519; 428/521; 425/388; 425/398; 425/118; 220/83; 220/DIG. 12; 220/DIG. 14
[51] Int. Cl.$^2$ ...................... B65D 11/02; B32B 1/04
[58] Field of Search ........... 260/23.5; 161/252–253, 161/255, 247; 428/35, 521, 516, 519, 500; 264/92; 220/74, 83; 117/138.8 UA, 161 UZ

[56] References Cited

UNITED STATES PATENTS

| 3,186,576 | 6/1965 | Whiteford | 220/74 X |
| 3,619,344 | 11/1971 | Wolinski | 161/161 |
| 3,684,633 | 8/1972 | Haase | 220/74 X |
| 3,826,404 | 7/1974 | Rowe et al. | 220/74 X |

*Primary Examiner*—P. C. Ives
*Attorney, Agent, or Firm*—Lloyd E. Hessenaur, Jr.

[57] ABSTRACT

A scrap free process for rapidly making thermoplastic containers wherein the resultant containers can, if desired, be multilayered for vapor or gas barrier or other reasons, or be oriented for toughness and improved stress crack resistance. The containers can be formed from multilayered or homogeneous plastic sheets wherein a relatively thin thermoplastic blank is provided. This blank is lubricated, heated and forged into a desired shape preform with a predetermined lip configuration. The center portion of each said preform is maintained at a forming temperature while the peripheral portion thereof is rapidly brought below the softening point of the plastic resin. The preform is then immediately thermoformed into a container having a desired shape and size, and cooled. If desired, the preform can be forged, cooled and recovered from a subsequent thermoforming operation.

14 Claims, 7 Drawing Figures

BIAXIALLY ORIENTED THERMOPLASTIC CONTAINER WITH OR WITHOUT MOLDED TIP PERIPHERY

This application is a continuation of copending application Ser. No. 389,921, filed Aug. 20, 1973, now abandoned, which in turn is a division of application Ser. No. 295,092, filed Oct. 2, 1972, now abandoned, which itself is in turn a division of application Ser. No. 62,969, filed Aug. 11, 1970, now U.S. Pat. No. 3,739,052.

BACKGROUND OF THE INVENTION

This invention relates to a high speed process for making thermoplastic containers wherein a thermoplastic blank is forged under proper conditions into a preform having a defined peripheral configuration and then immediately thermoformed into a container to produce the desired container shape having advantageous properties heretofore unobtainable in rapidly thermoformed containers.

It is well known that preforms can be injection molded from a molten polymer and later thermoformed into a thermoplastic cotainer. See, for example, U.S. Pat. Nos. 3,305,158 and 3,488,805. However, no quick forming process for thermoforming scrap free containers using other than an injection molding process has been known. Injection molding processes are severely limited in what can be done in forming the preform and the resultant qualities of the container. For example, the forming of oriented and/or multilayered preforms is not readily and easily accomplished in injection molding processes, and relatively expensive equipment is required.

SUMMARY OF THE INVENTION

The present invention is an improvement over the prior art in that an especially quick process of making a thermoplastic container is achieved, while the process is scrap free and provides a container which can be multilayered and/or oriented where desired. In the process a preform is forged in a matter of seconds with a finished rim and immediately thermoformed into the container while the relatively hot center portion thereof is still at a thermoforming temperature.

The present invention includes the following steps: A relatively thin thermoplastic blank is provided. Lubrication is then provided for the surfaces of the blank by directly lubricating the blank or the molds in which the blanks are forged. One of these blanks is then preheated to a temperature ranging from just below the softening point to about the melting point of the plastic resin and immediately forged in a heated mold into a desired shape preform in which the center portion thereof is maintained at its forming temperature while the peripheral portion is rapidly brought below the softening point of the plastic. The preform is then immediately thermoformed into a container having a desired shape and size, and cooled.

Orientation is built into the container through the forging of the preform and/or thermoforming of the containers by this process. A higher degree of orientation can be obtained if the preform is forged directly from oriented blanks; where forging is initiated below the softening point of the blank.

A further aspect of the present invention is the provision wherein a relatively thin thermoplastic blank is provided by dividing a sheet of plastic into a plurality of polygonal blanks having a size and shape such that scrap is minimized or eliminated. It particularly is desirable in this regard to cut the sheet into a series of square blanks. These blanks can then be forged to a desired forming shape such as circular with virtually no scrap.

Another aspect of this invention is the provision wherein blanks are forged in a forging means having a cooled lip forming means therein whereby the forging pressure applied is sufficient to cause the plastic blank to flow uniformly into the lip forming means with a dwell time just sufficient to cause the peripheral part thereof to be brought rapidly below the softening point of said plastic while the center portion is maintained at its forming temperature.

Other features of the process are that single and multiple layer preforms can be readily contoured to provide more uniform draw of containers, and the preforms can be distortion printed prior to thermoforming.

While a wide variety of thermoplastics can be used in this invention, the invention is particularly applicable to a multilayer sheet of at least two different plastics, for example, wherein the multilayer sheets or laminate consists of two sheets of a polyvinyl aromatic such as styrene, polyvinyl toluene, or rubber modified blends thereof with a core of polyvinylidene chloride (saran). A further useful laminate comprises two sheets of a polyolefin such as polyethylene or polypropylene with a core of polyvinylidene chloride.

The containers formed by this process when a multilayer blank is used containing a core of saran are particularly advantageous in that this process gives a composite wherein the saran layer is essentially pinhole free with no cracks. Hence, the containers are excellent barriers to gases, odors, etc. and are useful to package foodstuffs.

The invention is also applicable to the use of a single sheet of plastic such as polyolefin, i.e., polyethylene, polypropylene, etc., and polyvinyl aromatics such as polystyrene, as well as polyvinyl halides such as polyvinyl chloride, etc.

DETAILED DESCRIPTION

The process of this invention is illustrated by the drawings in which.

Figure 1:
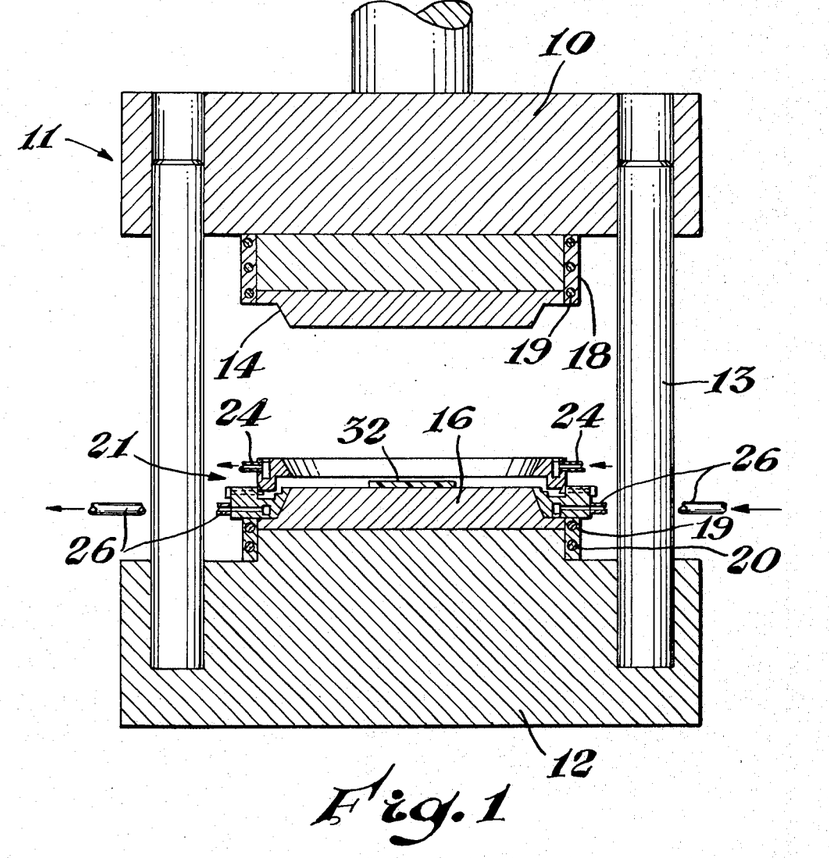
FIG. 1 is a diagrammatic, cross-sectional view of a forging press having heated platens and a cooled lip forming fixture in accordance with the present invention.

Referring more specifically to FIG. 1, 10 is the movable ram of a hydraulic or similar press 11 and 12 is the lower stationary ram of the same press 11. The upper ram 10 is guided during its vertical reciprocating motion by the guides 13 which are fixed into the lower ram 12. The upper ram 10 has a platen 14 secured to it in the center of a heating coil 18 which is provided with pipes 19 to carry a heating fluid such as steam or hot oil. In a similar manner, the lower stationary ram 12 has mounted on it a lower platen 16 which is likewise heated by a heating coil 20 having pipes 19 to carry the heating fluid. On top of the lower platen 16 a lip forming fixture 21 is removably mounted. This lip forming fixture 21 has flexible hoses 24 and 26 to carry a cooling fluid to and from the lip fixture.

Figure 2:
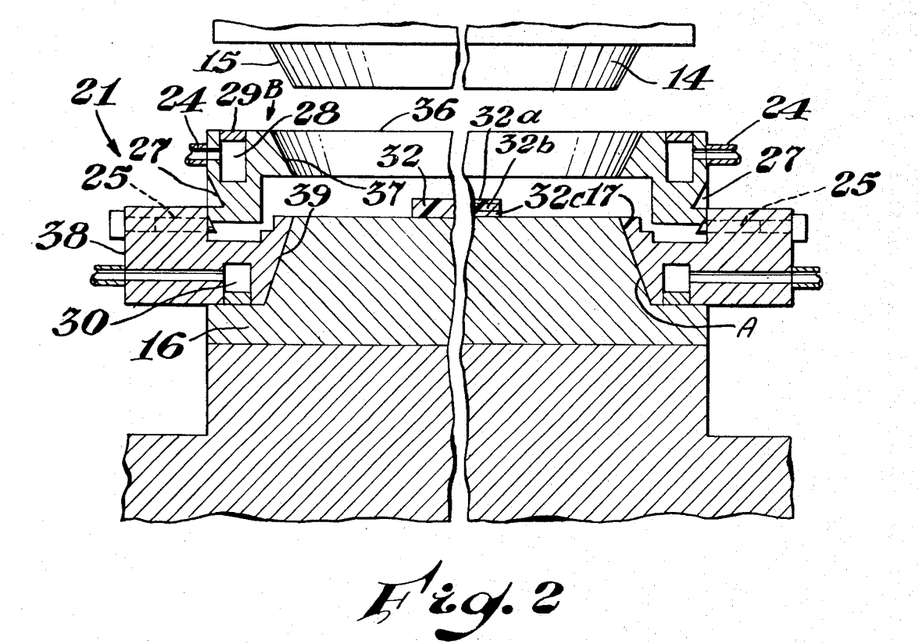
FIG. 2 is a similar view showing enlarged and in greater detail the relationship of the lip forming fixture to the platens of the press and to the blank which is to be forged.

In FIG. 2 the details of the lip forming fixture 21 are shown in greater detail. Thus, the lip forming fixture 21 comprises an upper ring 36 which is contoured at 37 to match the chamfered surface 15 of the upper platen 14 and a lower ring 38 which is likewise contoured at 39 to match the chamfered surface 17 of the lower platen 16. The upper ring is channeled to provide a circumferential cooling channel 28 which is sealed by a ring 29. In similar manner, the lower ring 38 is channeled to provide a cooling channel 30 which is sealed by a ring 31. Upper ring 36 includes a shoulder 61 and a lower ring 38 and a shoulder 62 and a face 63, which shoulders cooperate in a clamp fashion to firmly engage the top of preform lip 23 and present face 63 angled from the horizontal sufficient to resist the retraction stress of the polymer so that the preform will not pull out of the fixture 21 when the platen 14 is opened. At the same time the function of the clamp results in a finished molded lip about the rim of the preform.

Figure 3:
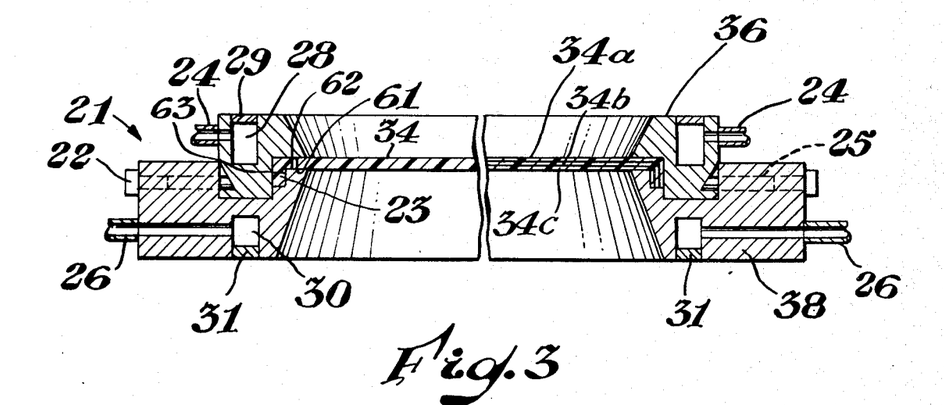
FIG. 3 is a view similar to FIG. 2 showing the relationship of the parts after the blank is forged into a preform.
Figure 4:
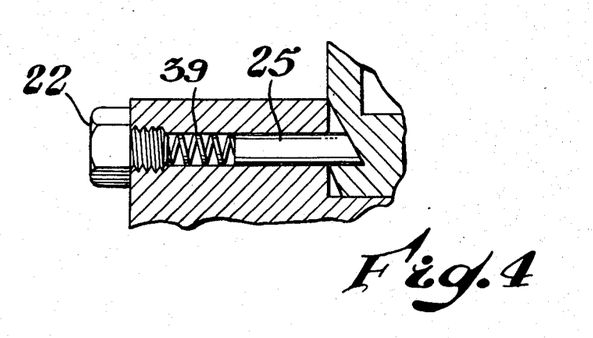
FIG. 4 is an enlarged, fragmentary sectional view of the lip forming fixture illustrating the details of the detent.

The upper ring 36 has a plurality of notches 27 cut out of the lower sides thereof. Three of these notches 27 have been found to be adequate for most purposes. However, more or less than this number can be used as is desired. These notches are for the purpose of obtaining a positive lock when the upper ring 36 is depressed into the lower ring 38. During the course of the downward movement of the upper ring 36, the spring detent 25 is pushed back momentarily against a spring 39 and then pushed forward to lock into the notch 27 as is shown in FIG. 3. Associated with the detent 25 is an adjusting screw 22 for adjusting the tension of the spring loaded detent 25. The series of flexible hoses 24 and 26 are provided to carry a cooling fluid such as cold water to the upper ring 36 and the lower ring 38, respectively.

Figure 5:
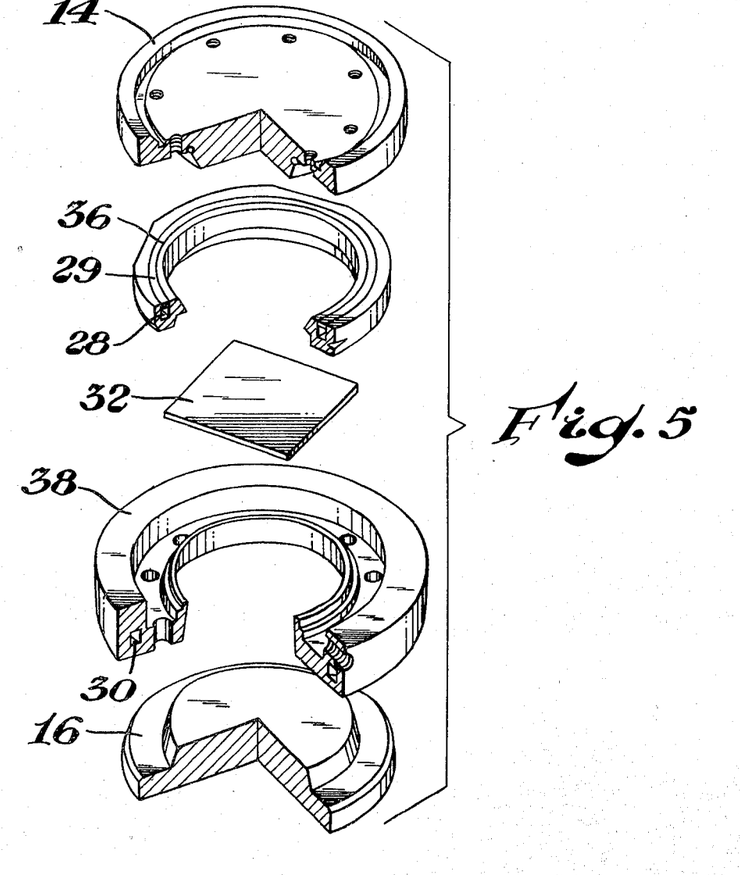
FIG. 5 is an exploded isometric view of the details of the lip forming fixture in relationship to the blank and the platens of the press.
Figure 6:
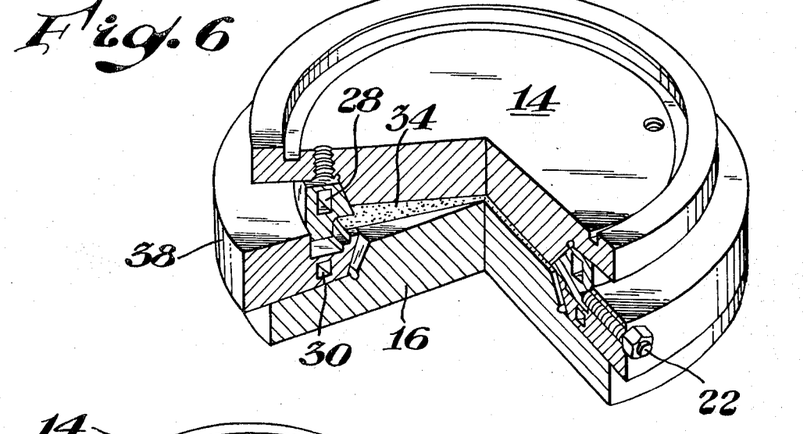
FIG. 6 is a similar isometric view showing the relationship of the parts after the platens have compressed the blank into a preform.

In FIGS. 5 and 6 essentially the same details shown in FIG. 2 are illustrated in exploded and isometric views to further clarify the relationship of the parts. For purposes of clarity, the flexible cooling tubes 24 and 26 are not illustrated in these figures. It is readily apparent that a plurality of these cooling tubes can be provided in order that the upper and lower rings are maintained at a uniform temperature substantially below that of heated platens.

In the steps of this process, a lubricant is applied to the surface of a blank 32 (which can be homogeneous as shown on the left side, or optionally multilayered, as layers 32a, 32b, 32c, for example, on the right side of FIG. 2) or platens of forging fixture 21, the blank 32 is then preheated in an air oven or other appropriate apparatus to a temperature ranging from just below the softening point to about the melting point of the plastic, and this is then placed on the lower platen 16. The upper ram 10 then descends under pressure to forge the heated blank 32 into the cavity between the platens 14 and 16 and into the adjacent lip forming cavity 23 (shown in FIG. 3) which is formed at the circumferential space between the upper ring 36 and the lower ring 38.

It is to be understood that the upper and lower platens 14 and 16, respectively, are previously heated to a forging temperature generally above the softening point of the plastic. The temperature of the platens and the blank can be the same or different but it is preferred to have the platens at a slightly higher temperature than the blank. It is also preferred to have the blank 32 preheated in an air oven or a similar device prior to its insertion into the fixture 21.

The platens can optionally be contoured (not shown) so that the forged preform will be correspondingly contoured with the result that the distribution of resin in the preform will permit more uniform drawing of the container. For example, more resin material can be located in that part of the preform from where the bottom corner of the container will be formed. This is readily accomplished whether the preform is homogeneous or multilayered.

The upper platen 14 remains in its lower compressing position for a dwell time just sufficient to cause the peripheral part of the resulting forged preform 34 (which can be homogeneous as shown on the left side, or optionally multilayered as layers 34a, 34b and 34c, for example, on the right side of FIG. 3) to be brought rapidly below the softening point of the plastic by the cooled lip fixture 21 and its associated parts. At the same time, the center portion of said preform remains in a softened state due to the higher temperature of the heated platens 14 and 16.

Figure 7:
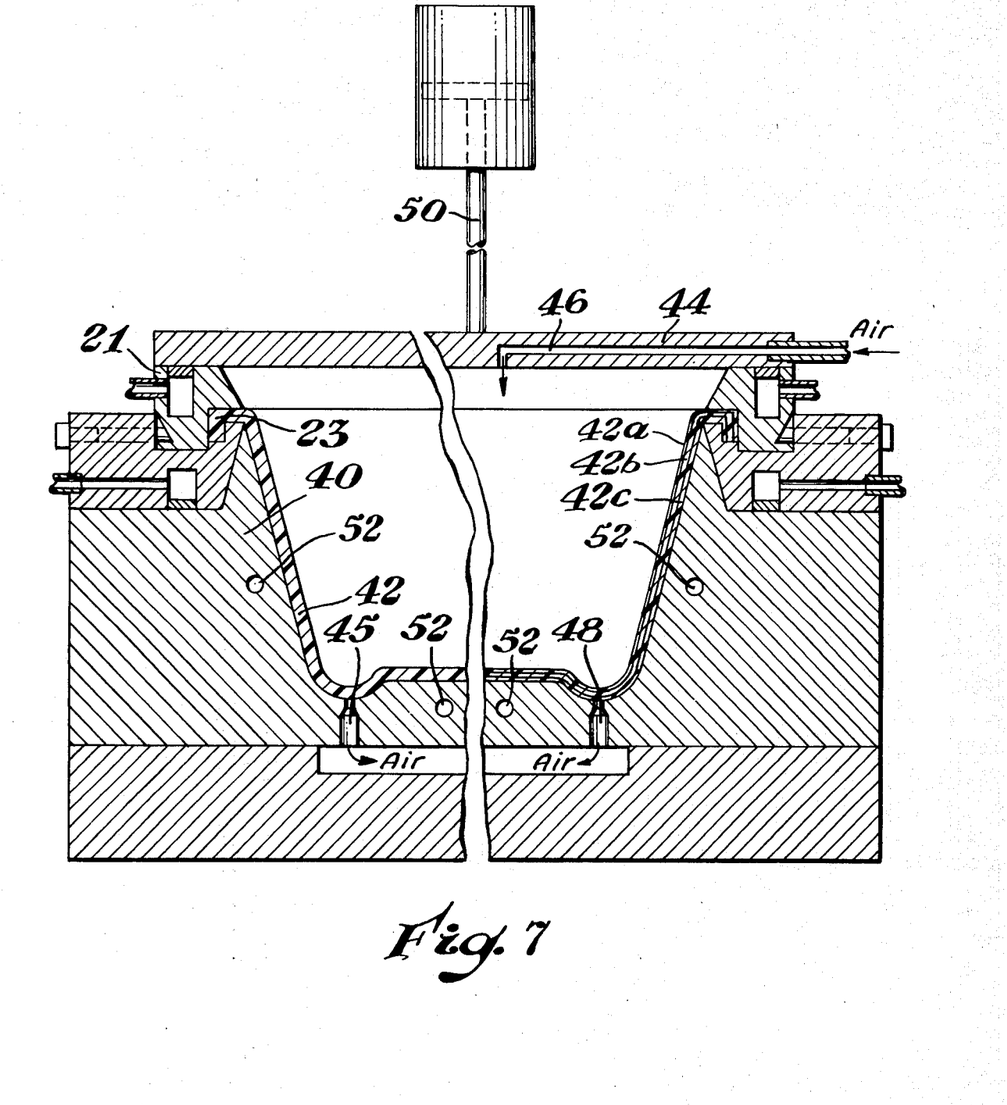
FIG. 7 is a view similar to FIG. 2 only showing apparatus for thermoforming the preform into a container.

The platens 14 and 16 are then withdrawn from the lip forming fixture 21, and the fixture 21 having the preform 34 contained therein is then moved rapidly to a mold 40 wherein a thermoforming operation is preformed to form the preform into the shape of container 42 (which can be homogeneous as shown on the left side, or optionally multilayered, as layers 42a, 42b and 42c, for example, on the right side of FIG. 7) including the rim or lip 23 as shown in FIG. 7. A top plate 44 is then clamped to the retaining ring 21 and applies air pressure through aperture 46 to the top of the preform to assist in the thermoforming operation. A vacuum can be drawn through vacuum ports 48 which, in cooperation with positive pressure from the aperture 46, performs the thermoforming function. A plug assist can also be used where an especially deep draw is necessary. A hydraulic mechanism 50 serves to move the top plate 44 up and down to open the cavity for removal of the part, and to close upon the clamp ring to secure the rim 23 in place during thermoforming, respectively. Transfer of a preform occurs while it is still hot moldable so that it can be vacuum formed into the mold 40 and there allowed to cool, and is then subsequently recovered. Cooling passages 52 can be used to assist the solidification of the container 42 in mold 40.

The use of lubricants on the blanks or on the platen surfaces or both is necessary in this invention to insure that the plastic flows uniformly into the mold cavity and to avoid warping. It has been found that without the use of lubricants, a laminated sheet will not flow uniformly into the cavity but that the internal layer or core will be substantially extruded ahead of the outer surfaces of the laminate so that partial or complete disruption of the laminates takes place. In other words, the lubricant permits "plug flow" of the blank (i.e., flow approaching the uniform velocity profile of the polymer cross-section) into the shape of the preform. Illustrative examples of lubricants that can be used are glycerine, fatty acid soaps, paraffin waxes, silicones, thermoplastic films, oils, and the like.

The plug flow resulting from the lubrication in turn permits the preform to be distortion printed prior to thermoforming into a container.

Since the thermoplastic resins that may be used in this invention are quite varied, it is obvious that the terms "forging temperature", "thermoflorming temperature", "softening point", and "melting point" used herein are relative terms and cannot be defined specifically without considering the characteristics of each resin employed in the process. Laminates of two or more plastics will have different forging temperatures, softening points, melting points, etc., than their component parts. Generally it has been found that the softening temperature of a laminate is dominated by the softening temperature of the surface layer in contact with the mold surface. For a given thermoplastic material, optimum forging temperature can be determined in accordance with accepted techniques by following the principles of this invention. The pressure ranges used in the forging step are quite variable according to the plastic which is to be forged and to the temperature to which it is heated and to the dimensions of the cavity at the mold lip.

It is essential to the success of this invention when using multilayer blanks that at least three conditions be obtained before the plastic blank is forged; (1) the blanks must be warm, i.e., preheated to a temperature ranging from just below its softening point to about its melting point depending on the particular resin in the blank; (2) the blank and/or the mold (i.e., platen) surfaces must be lubricated; and (3) the mold surfaces must be warm, i.e., heated to a temperature above the softening point of the resin of the blank.

As illustrations of the criticality of the foregoing conditions, it was observed that if the mold surfaces were cold, i.e., at room temperature, and the multilayer blank was heated to a forging temperature and no lubrication was used, the center layer of layers were squeezed out of the multilayered blanks. Even when lubricants were used under the above conditions, there was considerable extrusion of the middle layer or layers.

When both the blank and the mold were heated to a forging temperature and no lubrication was used, there was still extrusion of the middle layers. It was only when all three of the above conditions were observed that uniform preforms were obtained from the multilayer blanks.

When the process was applied to the homogenous plastic blank, i.e., a blank made from a single plastic sheet, the above conditions are not as critical, but is preferred to use them since by so doing the process is much faster and springback or warpage of the resultant container is eliminated.

EXAMPLES

The invention is further illustrated by the following examples.

Quantities of high impact polystyrene containing 5 percent styrene-butadiene rubber were compression molded or extruded into sheets or about 100 mils in thickness. Some of these sheets were then tentered and biaxially oriented at various temperatures as indicated in Table I. Square blanks of about 2–3 inches square were then cut from these sheets and forged into generally circular preforms and containers having a circular horizontal cross-section with a maximum diameter of 5 inches and a depth of 1½ inches, with outwardly sloping side walls in the manner indicated above. The results are indicated in Table I. In each Example of Table I the softening temperature was about 205° F., the melting temperature (usually not a definite point) was in the range of 300° to 550° F., and the forging temperature (temperature of forging platens) was about 265° F. In each example it can be seen that the blank preheat temperature (from Table I) was in the range of from just below the softening temperature to about the melting temperature of the resin of the blank, and the forging temperature was at least as high as the softening temperature of the resin.

TABLE I

| Example No. | Blank Orientation Conditions | Transparency of Sheet | Birefringence* Sheet | Birefringence* Container | Transparency of Sheet | Range of Preheat Temperature of Blank |
|---|---|---|---|---|---|---|
| 1 | Not oriented | Opaque | 0 | 4 × 10⁻³ | Opaque | 240°–260° F. |
| 2 | Stretched | Opaque | 1.2 × 10⁻³ | 12 × 10⁻³ | Transparent | 175°–190° F. |
| 3 | Stretched | Opaque | 2.2 × 10⁻³ | 14 × 10⁻³ | Transparent | 175°–190° F. |
| 4 | Stretched | Opaque | 4.1 × 10⁻³ | Not tested | Transparent | 175°–190° F. |
| 5 | Stretched | Opaque | 7.0 × 10⁻³ | No containers made due to inability of fixture to retain preform | — | 175°–190° F. |

*Index of orientation determined from fringe patterns under a polarized microscope with monochromatic light by the method of E. F. Gurnee Jour. of Applied Physics 25:1232–40 (1954)

In similar examples of the present invention, it was found that when a blank having no orientation was used to form a container according to this invention the container was always opaque but did have improved stregth and stress crack resistance due to orientation resulting from forging of the blank into a preform, and subsequent thermoforming of the preform into a container. If at least a moderate amount of orientation was present in the blank a generally transparent container usually resulted, and this container had greatly improved strength and stress crack resistance. The upper limit on the amount of orientation is determined by the physical characteristics of the lip forming fixture. For example, for every lip forming fixture there will be a point at which the stresses induced into an oriented blank are greater than the ability of the fixture to hold the lip of the resultant oriented preform when it is attempted to squeeze the blank into a preform. This is believed to be due to the fact that heat is developed in the blank when it is squeezed and the heat transferred from the mold which then causes the blank to shrink and revert back to its original unoriented size and shape, i.e., the "memory effect". In certain instances where some polymers are under high stress, the polymers heat distortion temperature may be decreased somewhat.

From the data presented in Table I it is evident that the process of this invention always produces a container having orientation greater than that of the blank from which it is formed with the added advantage that if the blank is opaque, due to the presence of small amounts of impact improvers such as various rubbers, the container usually will also be rendered generally transparent.

A summary of physical properties in a series of tests of sheet, preforms and containers when starting from sheets of different levels of orientation, where the containers are formed according to this invention, are set forth in Table II, the results clearly showing a dramatic increase in tensile strength for a given polystyrene material through the steps of the process and also as the orientation of the original sheet is increased. This increased orientation also contributes to highly improved stress crack resistance of the resulting polystyrene container, the relationship between increased orientation and stress crack resistance being well established. The physical properties of the sheet stock from which squares were cut, the 5⅛ inch diameter preforms and the former containers of Table II were all tested for tensile strength and percent of elongation by A. S. T. M. Method D1708-66 (Tensile Properties of Plastics by Use of Microtensile Specimens). I-shaped test bars were cut in the radial and tangential direction from the flat sections of the preform and the formed containers, and also from the sidewall of the formed container. In most cases, data for any one preform or container was averaged and reported as a single value.

TABLE II

| | | Summary of Physical Properties | | |
|---|---|---|---|---|
| | Properties of the Blank | Example 1 Polystyrene Unoriented Blank | Example 2 Polystyrene Biaxially Oriented Blank | Example 3 Polystyrene Biaxially Oriented Blank |
| | *Birefringence | 0 | $1.2 \times 10^{-3}$ | $2.2 \times 10^{-3}$ |
| | TS at Yield | 3810 psi | 4090 psi | 4320 psi |
| | TS at Rupture | 2950 psi | 4310 psi | 4800 psi |
| | Elong. at Rupture | 35% | 39% | 22% |
| | Properties of the 5⅛" Dia. Preform | | | |
| | *Birefrigence | $1.05 \times 10^{-3}$ | $3.4 \times 10^{-3}$ | $5.2 \times 10^{-3}$ |
| | TS at Yield | 4310 psi | 5500 psi | 6650 psi |
| | TS at Rupture | 4390 psi | 6850 psi | 6950 psi |
| | Elong. at Rupture | 38% | 43% | 60% |
| | Properties of the 5⅛" Dia. × 1½" Deep Formed Containers | | | |
| | *Birefringence | $4.0 \times 10^{-3}$ | $12 \times 10^{-3}$ | $14 \times 10^{-3}$ |
| | TS at Yield | 5690 psi | 8740 psi | 10,080 psi |
| | TS at Rupture | 6660 psi | 9100 psi | 10,440 psi |
| | Elong. at Rupture | 50% | 32% | 27% |

"*Birefringence" is defined in Table I
"TS" means tensile strength of section from Example
"Elong." means elongation of section from Example The above process was applied to multilayered sheets of varying composition and under varying conditions to form an essentially pinhole free circular container having a diameter of 5⅛ inches, a depth of 1½ inches and outwardly sloping side walls. The conditions and results are indicated below in Table III. In each of the five examples, the multilayered sheet was coextruded with a glue layer of a commercially available ethylene-vinyl acetate copolymer having a melt index of 6.0 and 28% vinyl acetate.

The results of the oxygen permeability test support the conclusion that the saran layer was continuous and essentially free of flaws since the values obtained are in good agreement with the calculated values for saran of the same thickness. Such items find especial use in containers for products having extreme sensitivity to oxygen penetration such as meat packages, latex paints, cheese, cooking oil and many other food products.

TABLE III

| Example | Compositions | Square Blank Size | Approximate Saran Thickness in Blank (Mils) | Blank Thickness (Mils) | Preheat Temp. °F. | Forge Temp. °F. | Press Dwell (Sec.) | Avg. Saran Thick. at Bottom of Container (Mils) | Oxygen Transmission Rate Mesr'd* | Oxygen Transmission Rate Calc'd |
|---|---|---|---|---|---|---|---|---|---|---|
| 6 | MIPS/S/MIPS | 2⅝" | 13.2 | 110 | 260 | 260 | 1 | 2.0 | 0.78 | 0.50 |
| 7 | MIPS/S/MIPS | 3⅛" | 9.6 | 95 | 260 | 260 | 1 | 2.4 | 0.49 | 0.42 |
| 8 | GPPS/S/GPPS | 2⅝" | 11.8 | 110 | 260 | 260 | 1 | 2.0 | 0.66 | 0.50 |
| 9 | GPPS/S/GPPS | 3⅛ | 11.0 | 110 | 260 | 260 | 1 | 2.9 | 0.34 | 0.34 |
| 10 | HDPE/S/HDPE | 3⅛ | 5.4 | 85 | 275 | 300 | 1 | 1.1 | 0.63 | 0.91 |

MIPS: Medium impact polystyrene (3.5% styrene-butadiene rubber)
GPPS: General purpose polystyrene (no rubber present)
S: Saran (vinylidene chloride/vinyl chloride copolymer)
HDPE: High density polyethylene 0.959 density 0.5 melt index
Mesr'd means "Measured"
Calc'd means "Calculated"
*c.c./100 in.² - 24 hours - atmosphere (of samples cut from the bottom of the formed container)

From the foregoing, it is evident that the process of this invention can be used to produce oriented containers with good stress craze resistance having one or more layers of the same or different polymers. For example, oleomargarine tubs can be made by this process from impact modified polystyrene which will have good resistance to the fatty oils of the oleomargarine by virtue of the orientation built into the tub by this process.

By using a white pigmented impact polystyrene sheet, e.g., one containing 1–5% by weight of finely divided titanium dioxide or other white pigments, in addition to styrene-butadiene rubber which has been laminated to an impact polystyrene sheet which has been pigmented with a contrasting pigment such as carbon black, one can obtain oleomargarine tubs or other food containers which are extremely attractive in that the inner surfaces are white while the outer surfaces are black or other colors. These containers, in addition to being attractive, are impact and stress craze resistant due to the orientation built into them by this process.

It should also be appreciated that the concepts of the present invention can be employed in rapid forming of preforms with finished rims, which preforms can be cooled once forged and stored for later use. When ready to be used the preforms can then be reheated and thermoformed into containers. This would be a readily inexpensive and highly practical way to obtain, for example, multilayered highly oriented preforms which can later be formed into especially advantageous containers of the type heretofore described.

While certain representative embodiments and details have been shown for the purpose of illustrating the invention, it will be apparent to those skilled in the art that various changes and modifications can be made therein without departing from the spirit and scope of the invention.

We claim:

1. A biaxially oriented thermoplastic container having a molded lip about its periphery and formed from a biaxially oriented preform, said preform formed from an unexpanded thermoplastic blank, said container having a greater degree of biaxial orientation than said preform and improved strength due to the greater degree of orientation.

2. The container of claim 1 having a Birefringence Index greater than $10 \times 10^{-3}$.

3. The container of claim 1 wherein said preform is multilayered.

4. The container of claim 3 wherein said container comprises an inner layer of a pigmented plastic and at least one additional layer of a contrastingly pigmented plastic.

5. The container of claim 4 wherein said plastic is a rubber modified polystyrene resin.

6. The container of claim 4 wherein said inner layer is pigmented with a white pigment and the outer layer is pigmented with a colored pigment.

7. The container of claim 4 wherein said container in addition includes an outer transparent polystyrene layer.

8. The container of claim 1 wherein said blank is biaxially oriented, said preform having a greater degree of biaxial orientation than said blank and improved strength due the the greater degree of orientation.

9. The container of claim 8 comprised of a rubber modified polystyrene.

10. The container of claim 9 having a tensile strength at yield and at rupture of at least 8000 psi.

11. The container of claim 9 wherein said preform was formed from a substantially opaque blank oriented throughout its structure, said container being substantially transparent.

12. The container of claim 8 having improved stress craze resistance due to the greater degree of orientation of the container over that of the blank and preform.

13. An oriented container formed from a high speed process comprising the steps of:
a. providing a thermoplastic blank of material sufficient for an article,
b. providing lubrication for said blank sufficient to permit substantial plug flow of the same in step (d),
c. bringing said blank to a temperature in a range from just below the softening temperature to about the melting temperature of the material forming said blank,
d. forging said blank by substantial plug flow in a forging mold heated to a temperature at least as high as the softening temperature of the material forming said blank, said blank being forged into a preform having orientation greater than that of said blank,
e. maintaining the center portion of said preform substantially at its forming temperature while the peripheral portion thereof is rapidly brought below the softening point of the material forming said blank,
f. immediately forming said preform into an article having a desired shape and size; and
g. permitting said article to cool.

14. The container of claim 13 wherein both the preform and container are multilayered.

* * * * *

UNITED STATES PATENT OFFICE
CERTIFICATE OF CORRECTION

PATENT NO. : 3,995,763
DATED : December 7, 1976
INVENTOR(S) : Ralph E. Ayres, Kenneth J. Cleereman and Walter J. Schrenk It is certified that error appears in the above-identified patent and that said Letters Patent are hereby corrected as shown below:

In the Abstract, line 6, "homogeneous" should read -- homogenous --.

Column 1, line 24, "cotainer" should read -- container --.

Column 5, line 8, insert quotation marks around the words "plug flow".

Column 5, line 13, "thermoflorming" should read -- thermoforming --.

Column 6, line 15, "or" (second occurrence) should read -- of --.

Column 6, line 54, "stregth" should read -- strength --.

Column 10, line 12, "the" (first occurrence) should read -- to --.

Signed and Sealed this

Sixth Day of September 1977

[SEAL]

Attest:

RUTH C. MASON
*Attesting Officer*

LUTRELLE F. PARKER
*Acting Commissioner of Patents and Trademarks*